UNITED STATES PATENT OFFICE.

BOJE R. ALBERTSEN, OF SAN FRANCISCO, CALIFORNIA, ASSIGNOR OF ONE-HALF TO ACHILLE LEVY, OF SAN FRANCISCO, CALIFORNIA.

PRESERVATIVE AND METHOD OF MAKING THE SAME.

1,062,683.

Specification of Letters Patent.

Patented May 27, 1913.

No Drawing.   Application filed August 30, 1910.   Serial No. 579,773.

*To all whom it may concern:*

Be it known that I, BOJE R. ALBERTSEN, a subject of the King of Denmark, residing at San Francisco, in the county of San Francisco and State of California, have invented new and useful Improvements in Preservatives and Methods of Making the Same, of which the following is a specification.

The present invention relates to a preservative compound, adapted to preserving eggs.

My invention also relates to the method of making such preservative.

The difficulty of preserving eggs by immersing them in preserving liquids is due to the porosity of the egg shells, which permits the penetration of the preserving liquid into the egg, which liquids then affect both the albumen and the yolk to such an extent as to make then unfit for use.

My invention is intended to seal the pores of the egg shells so as to make them proof against the penetration of the preserving liquid, and is accomplished by adding a mixture of kaolin, and water, in the proportions as hereinafter described, to a slaked lime solution. This combination of the kaolin mixture and slaked lime solution further results in the formation of a preserving liquid and also of a thin solid layer, having the appearance of an icing, on the top of the preserving liquid, which layer prevents the preserving liquid from becoming foul a result which usually occurs when a liquid remains motionless or stagnant for a long period.

The method of preparing the preserving liquid into which the eggs are immersed, is as follows:—I take three pounds of kaolin in the form of a powder, and mix with three pints of water to form a liquid mixture of the consistency of cream. Then, in another large vessel, I place one-half a barrel of unslaked lime, and add sufficient water to slake the lime. While this latter mixture of lime and water is still in the process of being slaked, I add the mixture of kaolin and water previously prepared, and add in addition thereto, five hundred gallons of water. This mixture is stirred continuously for one hour, then allowed to settle for twenty-four hours. A residue now forms and settles on the bottom of the vessel, leaving a somewhat clear liquid above it, which latter liquid constitutes the preserving liquid into which the eggs are to be immersed for preservation. A thin solid layer also forms upon the top of this latter liquid, which layer is supposed to be composed of kaolin, mixed with lime, and has the appearance of an icing.

The method of covering the eggs with the preserving liquid is then proceeded with, as follows:—A container having been selected into which to place the eggs, (said container being designated hereafter as the preserving tank), the thin solid layer, heretofore described as appearing on top of the slaked lime and kaolin mixture, is skimmed off and placed in the preserving tank. Next, the clear preserving liquid is drawn off, (preferably by means of a siphon arrangement), into the preserving tank, care being taken not to draw off any of the residue which has settled in the mixing vessel. The eggs are then placed into the preserving tank, which now contains the preserving liquid. The thin layer, previously skimmed off and placed in the preserving tank, rises to the top, and again forms a solid coating over the preserving liquid. This coating prevents the penetration of air into the liquid and keeps the latter from becoming foul. The preserving liquid should completely cover the eggs.

The above process results in sealing the shells and closing the eggs, and makes them liquid-proof and air-tight. This has been proven by the fact that eggs immersed one or two months in the liquid heretofore described have been taken out from the preserving liquid, and kept for a period of one year. At the end of that time, it has been found that the albumen and the yolk of the eggs remain unchanged. The albumen and the yolk remain firm, and the smell and flavor of the eggs are the same as in fresh eggs. The albumen, or white of the eggs, can also be beaten up, the same as with fresh eggs. The latter is a test resorted to by bakers in determining the suitability of eggs for making frostings and for other uses in the making of pastry.

Having thus described my invention, I claim:—

1. The process of manufacturing a preserving liquid for eggs, which consists in adding, to a slaked lime solution, kaolin mixed with water to the consistency of cream, thoroughly stirring the same, allowing it to settle, drawing off the clear preserving liquid.

2. A preservative liquid consisting of a slaked lime solution, and kaolin suspended therein and floated thereon.

In testimony whereof I have hereunto set my hand in the presence of two subscribing witnesses.

BOJE R. ALBERTSEN.

Witnesses:
    FRANCIS M. WRIGHT,
    D. B. RICHARDS.

Copies of this patent may be obtained for five cents each, by addressing the "Commissioner of Patents, Washington, D. C."